Patented May 20, 1924.

1,494,426

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

ZIRCONIUM OXIDE CONCENTRATE AND METHOD OF PRODUCING THE SAME.

No Drawing.   Application filed September 30, 1922. Serial No. 591,647.

*To all whom it may concern:*

Be it known that I, CHARLES J. KINZIE, a citizen of the United States, and a resident of Niagara Falls, in the county of Niagara and State of New York, have invented certain new and useful Improvements in Zirconium Oxide Concentrate and Methods of Producing the Same, of which the following is a specification.

My present invention relates to the obtaining of zirconium oxide from materials containing zirconium, or its compounds, associated with undesired substances such as compounds of iron, titanium, etc.

The objects of my invention comprise the provision of a method of treating such materials, particularly those artificially prepared materials containing preponderatingly what is known as zirconium nitride, or cyanonitride, or carbide, one or more, in such manner and with such reagents as to obtain with industrial economy and success a final zirconium oxide product of greater purity, density, opacity, covering power, and whiteness, than heretofore.

The utilities of zirconium as a pigment, or opacifier, particularly in white vitreous enamels, also as a refractory, are known, as well as many processes designed to free that oxide from coloring oxides, or compounds, particularly those of iron, but these have generally, if not universally proved either too costly for industrial use, or, more often, inadequate to produce products sufficiently free from discolor for certain purposes. Moreover, insufficient attention seems to have been paid to increasing opacity thereby giving the impression, which I have found to be erroneous, that zirconium oxide is necessarily inferior to stannic oxide in opaquing power.

I have also discovered that zirconium oxides of equal chemical purity may differ importantly in physical properties with respectively corresponding differences in the degrees of opacity thereby imparted, this being remarkably so as regards enamels. These differences in properties become evident when the said respective oxides are examined as to their respective densities (specific gravities), their liquid-absorbtive capacities, their hiding powers, and their effectiveness as opacifiers when actually employed in enamelling steel and other materials. I have furthermore, and as I believe importantly, discovered that titanium oxide, if in such quantity as seems to have been present in previous zirconium oxide products, so acts as to increase, or intensify, the undesirable discolorations due to presence of other impurities such as iron, and my process provides means for preliminarily eliminating most of the titanium as hereinafter described so that such iron compounds as are not subsequently removed in the process, if any, have substantially no discoloring effect. My present invention is largely based upon my discovery of means and procedures whereby the zirconium-containing materials treated can be brought into such condition that their content of iron oxide or other compounds is soluble to large degree in dilute acids leaving the zirconium oxide substantially unaffected and in a form which is not only of greater purity, but also of greater density, opacity, and whiteness than any such product hitherto known to me.

My referred to means and procedures include as one distinctive feature the obtainment from the materials treated of a zirconium sulphate solution and may also comprise as another or prefered feature the step of adding to such solution a compound of an alkali metal preferably common salt (NaCl) as will more fully appear from the hereinafter cited examples.

My invention is, broadly speaking, workable as follows: The material to be treated by my method, as for example raw or natural ores, sands, etc. containing zirconium, or its compounds, is preferably preliminarily purified from iron, titanium, or other undesired components to such extent as can be by aid of any hitherto known method, for example that described and claimed in the now pending application for patent of Louis E. Barton and myself Serial Number 485,404, filed July 14, 1921, and its zirconium constituents are also preferably, when possible, converted into that form or compound which I particularly prefer for my purposes and which is known as "zirconium cyanonitride," being the product described and claimed in Letters Patent No. 1,342,084, granted to Louis E. Barton June 1st, 1920, and, as therein described, obtained by aid of melting the zirconium-containing material with a carbonaceous reducing agent to production of said zirconium cyanonitride.

The material to be treated (said zirconium cyanonitride for example) and which, though preferably purified as above referred to, still contains more iron and other impurities than are desirable, or are prohibitory for certain uses, I preferably crush, and further mill to fine powder, for example, such as to pass a 300 mesh screen.

This milled material I mix with cold sulphuric acid about 93% strength, using about 2.85 parts acid to one of the cyanonitride and the cold mixture I charge cautiously into an iron pan or other suitable vessel previously heated to about 200° C. As the liquid mix comes in contact with the pan a vigorous reaction occurs by which the zirconium compounds, say the cyanonitride, are converted, to large extent, into zirconium sulphate. The resulting porous cake I heat at a temperature of about 300° C., for a period of say 2 hours or until over 95% of the total zirconium in the batch has been converted into water soluble zirconium sulphate; I find that if the batch is stopped shortly after reaction only about 75% of the zirconium will dissolve in water.

The resulting mass I charge directly after baking, while hot, into cold water, or I cool and dissolve it in cold or warm water. I prefer to charge the cake while warm or hot into cold water so regulating the addition of cake as to avoid too vigorous boiling of the solution. The cake is extremely soluble and no external heat need be applied. I finally adjust the strength of the charge as may be indicated and let it settle until the insoluble silicious and other material settles out, leaving a clear zirconium sulphate solution, which, in a typical case in which zirconium cyanonitride was the material treated, gave by analysis the following:

| | | Per cent. |
|---|---|---|
| Zirconium oxide | $ZrO_2$ | 9.80 |
| Ironoxid calc. to $Fe_2O_3$ | $Fe_2O_3$ | 0.045 |
| Titanium oxide calc. to $TiO_2$ | $TiO_2$ | 0.048 |
| Total sulphates calc. to $H_2SO_4$ | $H_2SO_4$ | 18.35 |
| Water free or combined | $H_2O$ | 71.757 |
| | | 100. |

Specific gravity at 25° C., 1.235.

My next step is, if indicated, to charge into the zirconium sulphate solution a compound of an alkali metal, for example, and preferably, common salt (NaCl) in quantity sufficient to form sodium sulphate ($Na_2SO_4$) with the sulphates in solution as per the formula $H_2SO_4 + 2NaCl = 2HCl + Na_2SO_4$. The resulting mix I heat and stir until the salt dissolves, when the stirring can be discontinued; upon further heating abundant crystals of hydrated sodium zirconium sulphate are formed, the charge becoming quite thick. This charge I bake in a suitable chamber and the excess water as well as hydrochloric acid is distilled off and collected (if desired); the mass finally becoming quite dry and solid but not hard. It can be easily removed from the container. This I prefer to do and to charge the dry mass into a furnace, finally raising the temperature until the mass melts, some HCl and sulphur gases being evolved. Finally, at a temperature of say about 900° C. the mass assumes a condition in which its zirconium oxide, iron, and titanium oxide, become insoluble in water or largely so, the mass becoming of a mush-like consistency. I then remove it from the furnace and cool it.

The now dense and cold mass I leach with warm or hot water to dissolve its sodium compounds, leaving the zirconium oxide with small amounts of titanium and iron oxide insoluble. These I filter or otherwise separate from what remains of the solution of sodium sulphate, and wash to remove the major part of the soluble sodium compounds; the sodium sulphate liquor resulting from this extraction being of value for production therefrom of a high grade of sodium sulphate or Glauber's salts as a by-product.

The zirconium oxide residue left from the foregoing extraction with water I either dry, or dry and calcine, thereby rendering it suitable for certain purposes; but I prefer to charge this wet zirconium oxide sludge, or filter cake into a suitable container and treat it with hydrochloric, or other suitable acid of such strength as may be indicated, and at about 90° C., the iron compounds dissolving readily, and this treatment requiring only about an hour or so. The charge I then dilute with cold water and wash by suitable means to remove the dissolved iron, thereby also further washing out sodium sulphate or sodium chloride.

The zirconium oxide should, at this stage, be found free of combined sulphur compounds and, provided no extraneous material such as carbonaceous matter has been introduced, will require drying only at a low temperature; but I prefer to calcine the charge at about 900° C., to preclude possibility of the zirconium oxide containing impurities such as combined $SO_3$ or other volatile or organic matter.

In order that the advantages of my above described procedures may be better appreciated and the effects of the respective features thereof understood, and also particularly to illustrate the physical differences possible between two zirconium oxide products of substantially the same composition chemically, I append the following examples of treatments of such a zirconium sulphate solution as has been above specifically described.

Example No. 1.

Taking 1000 grams of the said solution I evaporated it at temperature of 100–300° C. until the water was expelled to sufficient extent to form a solid cake. I then placed the charge in a furnace and gradually raised the temperature until all combined sulphuric acid was driven out, this requiring continued heating at about 900° C. for several hours. I thus finally obtained a zirconium oxide free from sulphuric acid. This product was cream to reddish in tone. I then cooled and pulverized it, it being of very soft and fluffy nature the breaking down proved easy. The dry zirconium oxide I then charged into a beaker with 100 cc. hydrochloric acid (1.11 sp. gr.), and digested the mixture at 90–95° C. for 2 hours, diluted it to 500 cc. and filtered, washed, dried, and calcined it.

My resulting product, consisting essentially of zirconium oxide, yielded by analysis the following, viz:

|  |  | Per cent. |
|---|---|---|
| Zirconium oxide | $ZrO_2$ | 98.19 |
| Titanium oxide | $TiO_2$ | 0.25 |
| Iron oxide | $Fe_2O_3$ | 0.10 |
| Aluminum oxide | $Al_2O_3$ | 0.80 |
| Silicon oxide | $SiO_2$ | 0.56 |

Its specific gravity (density) was 5.233; its oil absorbing capacity, 28.63%; its hiding power (opacity) about 49%.

It required about 15% thereof (by weight) for it to produce opacity in enamel for sheet steel. Its color was light cream.

Example No. 2.

Taking again 1000 grams of the said zirconium sulphate solution I added thereto 218 grams rock salt (NaCl). I then heated the charge and stirred it until the salt had dissolved. I continued the heating until dry cake was obtained, the temperature being about 300° C. at the finish of this stage. The dry cake I next heated to higher temperature, finally to about 900° C., this operation requiring less than two hours, and the volume of resulting mush at this stage being much less than the volume of the residual product obtained by calcining in Example No. 1, and this though the actual weight of said mush was nearly four times that of said product of No. 1. The mush I scraped out of the container and cooled, extracted with hot water, filtered and washed it. In the form of a wet filter cake I then placed it in a beaker and treated it with 100 cc. (1.11 sp. gr.) HCl at 90–95° C. for two hours, I then diluted it to 500 cc., filtered it, and washed it free of dissolved iron, etc., dried it, and finally calcined it.

My resulting product, in this instance also consisting essentially of zirconium oxide, gave by analysis the following, viz:

|  |  | Per cent. |
|---|---|---|
| Zirconium oxide | $ZrO_2$ | 97.76 |
| Titanium oxide | $TiO_2$ | 0.20 |
| Iron oxide | $Fe_2O_3$ | 0.11 |
| Aluminum oxide | $Al_2O_3$ | 0.88 |
| Silicon oxide | $SiO_2$ | 0.80 |

Its specific gravity (density) was 5.843; its oil absorbing capacity was 18.25%; its hiding power (opacity) was 116.00%.

It required only about 7% thereof, by weight, for it to produce opacity in enamel for sheet steel, this being only about the same amount as required of tin oxide to produce the same result. Its color was white.

I found further that the zirconium oxide product of Example No. 1, if calcined at 1130° C. for two hours turned quite brown in color and shrunk considerably in volume, while the product of Example No. 2, when similarly calcined, remained white and did not shrink. Also that when both of said products were calcined at 1350° C., that that of No. 1 became still darker in color and shrank more than at 1130° C., while the product of No. 2 merely changed to slightly greyish in color and shrunk only moderately.

While the product described in Example No. 1 is useful for some purposes, it is particularly the object of my process to produce zirconium oxide having the chemical purity and physical characteristics indicated by Example No. 2, i. e. exceptional whiteness of color, fineness, opacity and particularly greater density.

These and other desirable peculiarities of my zirconium oxide product I believe to be attributable to my aforesaid novel method, or step, of producing and employing a zirconium sulphate solution, and also to my introduction of an alkali metal salt forming a zirconium compound of an alkali metal, and heating to decomposition of the zirconium compound to zirconium oxide and an alkali metal salt.

The exceptional whiteness of my product I believe to be largely, if not altogether, attributable to the previously unprecedented comparative degree of preliminary elimination of titanium oxide from the material treated and to the exceptionally favorable physical condition (fineness) of the heated or calcined mass for subsequent extraction of remaining iron compounds by acid treatment.

My said zirconium oxide product thus characterized by novel physical properties, qualities, and behaviors imparted by aid of my processes I find to be especially well adapted for use as an opaquing agent in enamels for iron and steel bodies, porcelain bodies, terra cotta bodies, in fact in any enamel in which the glass substance is first prepared by melting and ultimately prepared for application by mixing and milling with clay, an opaquing agent and water, etc., to prepare a slip of proper consistency to use. When used in this manner, my said zirconium oxide product is equivalent to tin oxide in the ability to produce enamels of great opacity, good white tone and high lustre.

My said product is also on account of its exceptional density and chemical purity correspondingly adapted for use in the production of refractories. On account of its superior fineness it is also especially useful in the bonding of articles composed preponderatingly of compounds of zirconium. Its excellent white tone and relatively great hiding power also adapts it for paint pigments and especially so when intense whiteness is of paramount importance.

Having now described my invention, what I claim as new and desire to secure by Letters Patent is the following, viz:

1. The method of treating material containing compounds of zirconium and undesired substances which comprises mixing said material with sulphuric acid; heating the mixture to production of water-soluble zirconium sulphate; charging the resulting product into water; withdrawing the resulting zirconium sulphate solution; adding to said solution a compound of sodium to production of crystals of hydrated sodium zirconium sulphate; expelling excess water and hydrochloric acid from the charge; melting the resulting mass to insolubility of its zirconium, iron and titanium oxides; leaching the mass to solution of its sodium compounds; withdrawing from the mass its water-insoluble oxides; and treating them with mineral acid so dilute as to dissolve some oxides other than the zirconium oxide; withdrawing the so dissolved oxides; and drying the residuum.

2. The method of treating material containing compounds of zirconium and undesired substances which comprises mixing said material with sulphuric acid; heating the mixture to production of water-soluble zirconium sulphate; charging the resulting product into water; withdrawing the resulting zirconium sulphate solution; adding to said solution a compound of sodium to production of crystals of hydrated sodium zirconium sulphate; expelling excess of water and hydrochloric acid from the charge; melting the resulting mass to insolubility of its zirconium, iron and titanium oxides; leaching the mass to solution of its sodium compounds; withdrawing from the mass its water-insoluble oxides; and treating them with mineral acid so dilute as to dissolve some oxides other than the zirconium oxide; withdrawing the so dissolved oxides; and calcining the residuum.

3. The method of deriving zirconium oxide, from material composed of compounds of zirconium associated with undesired substances, which comprises as a preliminary step the procuring of said zirconium-containing compounds to include nitrogen as an element thereof; and as subsequent steps the mixing of said nitrogen-zirconium compounds with cold sulphuric acid; and heating the resulting mixture to decomposition of said compounds, and formation of a water-soluble zirconium sulphate.

4. The method of deriving zirconium oxide, from material composed of compounds of zirconium associated with undesired substances, which comprises as a preliminary step treatment of the material to production of zirconium cyanonitride from its said compounds, and as subsequent steps milling the resulting product, mixing it with cold sulphuric acid, heating the resulting mixture to decomposition of its zirconium cyanonitride and formation of a water-soluble zirconium sulphate.

5. The method of deriving zirconium oxide, from material composed of compounds of zirconium associated with undesired substances, which comprises melting said material with a carbonaceous reducing agent to production of zirconium cyanonitride; mixing and heating the resulting product with sulphuric acid to decomposition of the zirconium cyanonitride adding water to production of a zirconium sulphate solution, and adding to said solution a compound of an alkali metal.

6. In the derivation of zirconium oxide from material composed of compounds of zirconium associated with undesired substances, the steps which consist in mixing and heating said material with sulphuric acid; adding water to production of a zirconium sulphate solution; and adding to said solution chloride of sodium.

7. In the derivation of zirconium oxide from material composed of compounds of zirconium associated with undesired substances, the steps which consist in producing a zirconium sulphate solution of said compounds and adding to said solution a compound of sodium to production of crystals of hydrated sodium zirconium sulphate.

8. In the derivation of zirconium oxide from material composed of compounds of zirconium associated with undesired substances, the steps which consist in producing a zirconium sulphate solution of said compounds; adding to said solution a compound of sodium to production of crystals of hydrated sodium zirconium sulphate; and melting the mass to insolubility of its zirconium oxide.

9. In the derivation of zirconium oxide from material composed of compounds of zirconium associated with undesired substances, the steps which consist in producing a zirconium sulphate solution of said compounds; adding to said solution a compound of sodium to production of crystals of hydrated sodium zirconium sulphate; melting the mass to insolubility of its zirconium and other oxides; and treating said mass with acid such and so dilute as to dissolve some of its oxides other than the zirconium oxide.

CHARLES J. KINZIE.

Witnesses:
L. E. BARTON,
R. S. TABOR.